United States Patent
Schunder et al.

(10) Patent No.: US 9,451,030 B2
(45) Date of Patent: Sep. 20, 2016

(54) CROWDSOURCED WEATHER DATA COLLECTION AND PROVISION

(75) Inventors: Mark Schunder, Dearborn, MI (US); Steven Joseph Szwabowski, Northville, MI (US); Dimitar Petrov Filev, Novi, MI (US); Perry Robinson MacNeille, Lathrup Village, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1301 days.

(21) Appl. No.: 13/030,504

(22) Filed: Feb. 18, 2011

(65) Prior Publication Data

US 2012/0215446 A1    Aug. 23, 2012

(51) Int. Cl.
*G01W 1/00* (2006.01)
*H04L 29/08* (2006.01)
*G07C 5/00* (2006.01)
*G07C 5/08* (2006.01)

(52) U.S. Cl.
CPC ............. *H04L 67/125* (2013.01); *G07C 5/008* (2013.01); *G07C 5/085* (2013.01)

(58) Field of Classification Search
CPC ...... G07C 5/008; G07C 5/085; H04L 67/125
USPC .......................... 702/3; 701/208; 342/357.52
See application file for complete search history.

(56) References Cited

U.S. PATENT DOCUMENTS

| | | | |
|---|---|---|---|
| 5,693,876 A | 12/1997 | Ghitea, Jr. et al. | |
| 6,044,315 A | 3/2000 | Honeck et al. | |
| 6,092,021 A | 7/2000 | Ehlbeck et al. | |
| 6,686,878 B1 * | 2/2004 | Lange | 342/357.52 |
| 6,718,263 B1 | 4/2004 | Glass et al. | |
| 7,174,171 B2 | 2/2007 | Jones | |
| 7,174,243 B1 | 2/2007 | Lightner et al. | |
| 7,228,211 B1 | 6/2007 | Lowrey et al. | |
| 7,650,219 B2 | 1/2010 | Livshiz et al. | |
| 7,698,049 B2 | 4/2010 | Whitney et al. | |
| 8,009,026 B2 | 8/2011 | Giuli | |
| 8,054,193 B1 | 11/2011 | Breed et al. | |
| 8,096,174 B2 | 1/2012 | Katou | |

(Continued)

OTHER PUBLICATIONS

Printout from http://www.core77.com/greenergadgets/entry, Tweet-a-Watt, A twittering power meter, Limor Fried, Adafruit Industries & Phillip Torrone MAKE magazine (United States).

(Continued)

*Primary Examiner* — Gregory J Toatley
*Assistant Examiner* — Yoshihisa Ishizuka
(74) *Attorney, Agent, or Firm* — Jennifer Stec; Brooks Kushman P.C.

(57) ABSTRACT

A computer-implemented method of gathering data includes querying, via a vehicle computing system, a plurality of weather sensors included with a vehicle and in communication with a vehicle network. The method also includes determining whether or not appropriate conditions exist for storage of data from the sensor, for each of the sensors. Additionally, the method includes storing the data from the sensor if appropriate conditions exist. Finally, the method includes sending, from the vehicle computing system to a remote network, data from one or more queried sensors and current GPS coordinates of the vehicle.

10 Claims, 5 Drawing Sheets

(56) References Cited

U.S. PATENT DOCUMENTS

| | | |
|---|---|---|
| 8,886,386 B2 | 11/2014 | Merk |
| 2004/0034460 A1 | 2/2004 | Folkerts et al. |
| 2005/0026697 A1 | 2/2005 | Balahura et al. |
| 2005/0187714 A1* | 8/2005 | Brulle-Drews ............... 702/3 |
| 2006/0064232 A1* | 3/2006 | Ampunan et al. ........... 701/115 |
| 2006/0226967 A1 | 10/2006 | Tranchina |
| 2007/0162550 A1 | 7/2007 | Rosenberg |
| 2008/0082221 A1 | 4/2008 | Nagy |
| 2008/0146343 A1 | 6/2008 | Sullivan et al. |
| 2008/0177554 A1 | 7/2008 | Srinivasan et al. |
| 2008/0220878 A1 | 9/2008 | Michaelis |
| 2008/0274810 A1 | 11/2008 | Hayashi et al. |
| 2009/0011834 A1 | 1/2009 | Chhabra |
| 2009/0047982 A1 | 2/2009 | Shi et al. |
| 2009/0081947 A1 | 3/2009 | Margis |
| 2009/0093236 A1* | 4/2009 | Balan et al. ............... 455/411 |
| 2009/0306890 A1* | 12/2009 | Yoshida ..................... 701/208 |
| 2010/0075593 A1 | 3/2010 | Lee et al. |
| 2010/0077094 A1 | 3/2010 | Howarter et al. |
| 2010/0163220 A1* | 7/2010 | Nakajima ................... 165/202 |
| 2010/0197406 A1 | 8/2010 | Giuli |
| 2010/0207755 A1 | 8/2010 | Watson et al. |
| 2010/0214089 A1 | 8/2010 | Giuli |
| 2010/0280678 A1 | 11/2010 | Tate, Jr. et al. |
| 2010/0286899 A1* | 11/2010 | Jain et al. .................. 701/119 |
| 2011/0045842 A1 | 2/2011 | Rork et al. |
| 2011/0107239 A1 | 5/2011 | Adoni et al. |
| 2011/0137996 A1 | 6/2011 | Stewart |
| 2011/0238752 A1 | 9/2011 | Weiss et al. |
| 2012/0001744 A1 | 1/2012 | Giuli |

OTHER PUBLICATIONS

Printout from http://hackaday.com/2009/01/02/twittering-washing-machine/, Twitter washing machine.
Printout from http://www.intomobile.com/2008/07/19/twinkle-hits-appstore-location-based-twitter-client, Client for iPhone.
Printout from http://www.tuae.com/2008/04/22/twinkle-geolocational-twitter-on-iphone, Twinkle: location-aware Twitter client for iPhone.
Printout from http://www.iphonehacks.com/2008/04/twitter-twinkle.html, Twinkle-iPhone Twitter App adds Location Feature.
Ford Motor Company, "SYNC with Navigation System," Owner's Guide Supplement, SYNC System Version 1 (Jul. 2007).
Ford Motor Company, "SYNC," Owners's Guide Supplement, SYNC System Version 1 (Nov. 2007).
Ford Motor Company, "SYNC with Navigation System," Owner's Guide Supplement, SYNC System Version 2 (Oct. 2008).
Ford Motor Company, "SYNC," Owner's Guide Supplement, SYNC System Version 2 (Oct. 2008).
Ford Motor Company, "SYNC with Navigation System," Owner's Guide Supplement, SYNC System Version 3 (Jul. 2009).
Ford Motor Company, "SYNC," Owner's Guide Supplement, SYNC System Version 3 (Aug. 2009).
Kermit Whitfield, "A hitchhiker's guide to the telematics ecosystem," Automotive Design & Production, Oct. 2003, http://findarticles.com, pp. 103.
Chinese Patent and Trademark Office, First Chinese Office Action for the corresponding Chinese Patent Application No. 201210024513.7 dated Apr. 29, 2015.

* cited by examiner

CROWDSOURCED WEATHER DATA COLLECTION AND PROVISION

BACKGROUND

If there's one notorious truth about weather prediction, it's that, as scientific of a process as it appears to be, weather forecasts are still seemingly "random" in their accuracy. Partially, this can be attributed to the myriad of unknown and/or unknowable factors that affect local weather, but partially this can be attributed to a lack of suitable data samples.

TECHNICAL FIELD

Modern weather forecasters have a variety of tools at their disposal. Satellite imagery, weather balloons, weather stations, visual confirmation, and other weather forecasters all are capable of adding information to a conglomerate pool. Even so, satellites sit thousands of miles above the earth, weather balloons are infrequent and subject to random movement, weather stations are spread sometimes miles apart, visual confirmation can only inform that the weather being reported is, in fact occurring, and other weather forecasters are subject to similar limitations.

Generally, it is likely cost-prohibitive to launch more satellites or build more weather stations. Satellites cost millions of dollars to build and launch, and, limitations on total numbers allowable aside, there is no clear indication that a sufficient number of satellites would provide a spot-on accurate forecast. Thus, the likely gain of a new multi-million dollar satellite must be considered against the cost of launching it.

Similarly, weather stations and data gathering points have associated costs. While it may be the case that sufficient data gathering could provide more accurate predictions, and certainly it would provide a more accurate view of conditions at a given point (i.e., predicting the temperature/humidity/etc. at location X,Y will of course be more precise with 500 data points within 1 mile of X, Y as opposed to four data points), again a cost-benefit analysis must exist. Is it worth the cost of building 100,000 additional weather stations for a city, so that the degree of prediction rises a percentage? What revenues does this additional data bring in? Certainly, one could suppose that if perfect weather prediction could occur, it might be worth it, but even the ability to predict weather perfectly does not guarantee a desired return on investment, since that data can be easily "taken" (as the predictions are generally publicly broadcast) and used.

Several annual publications rely on more "fringe" techniques to predict weather. Typically called Farmer's Almanacs, these publications have been successfully in print for over a century, and they provide predictions that are seemingly sufficient to draw continued readership, despite their reliance on somewhat "unrecognized" factors, such as planetary alignment, sunspots, tidal flux, etc. Nonetheless, they are evidence that there is big business in consistent and accurate weather prediction.

SUMMARY

In a first illustrative embodiment, a computer-implemented method of gathering data includes querying, via a vehicle computing system, a plurality of weather sensors included with a vehicle and in communication with a vehicle network. This illustrative method also includes determining whether or not appropriate conditions exist for storage of data from the sensor, for each of the sensors.

Additionally, this illustrative method includes storing the data from the sensor if appropriate conditions exist. Finally, the method includes sending, from the vehicle computing system to a remote network, data from one or more queried sensors and current GPS coordinates of the vehicle.

In a second illustrative embodiment, a computer-implemented method of providing a real-time weather report for a vehicle includes receiving, at a server, a request for a weather report from a vehicle computing system. In this embodiment, the request includes GPS coordinates of a requesting vehicle.

This illustrative method also includes gathering, via one or more server-implemented gathering processes, a plurality of points of data from a database. In this illustrative example, the points of data correspond to weather data reported from other vehicles at a time in close proximity to a present time. Further, the data corresponds to data reported from coordinates within a close proximity to the included GPS coordinates.

The illustrative method further includes aggregating, via one or more server-implemented aggregation processes, the data to form a weather prediction for the included GPS coordinates. Finally, the illustrative method includes reporting the weather prediction to the vehicle computing system from the server.

A third illustrative embodiment includes a computer-implemented method of providing predictive weather data including receiving, at a server, a request for a weather report from a vehicle computing system. In this illustrative embodiment, the request includes GPS coordinates of a requesting vehicle, a current heading of the requesting vehicle, a current speed of the requesting vehicle, and a future time or location or both for which a weather report is requested.

Also, in this illustrative embodiment, the method includes estimating a location of the vehicle at the future time, if the location for which the weather report was requested was not provided, and/or estimating a time at which the vehicle will reach the future location, if the future time for which the weather report was requested is not included.

The illustrative method further includes gathering, via one or more server-implemented gathering processes, a plurality of points of data from a database. In this embodiment, the points of data correspond to weather data reported from other vehicles at a time in close proximity to a present time.

In this embodiment, data is gathered from instances where the other vehicles reported the data from coordinates within a close proximity to the estimated location of the vehicle at the future time or the included location for which a weather report is requested.

The illustrative method further includes aggregating, via one or more server-implemented aggregation processes, the data to form a weather prediction for the included GPS coordinates. Finally, the method includes reporting the weather prediction to the vehicle computing system from the server.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
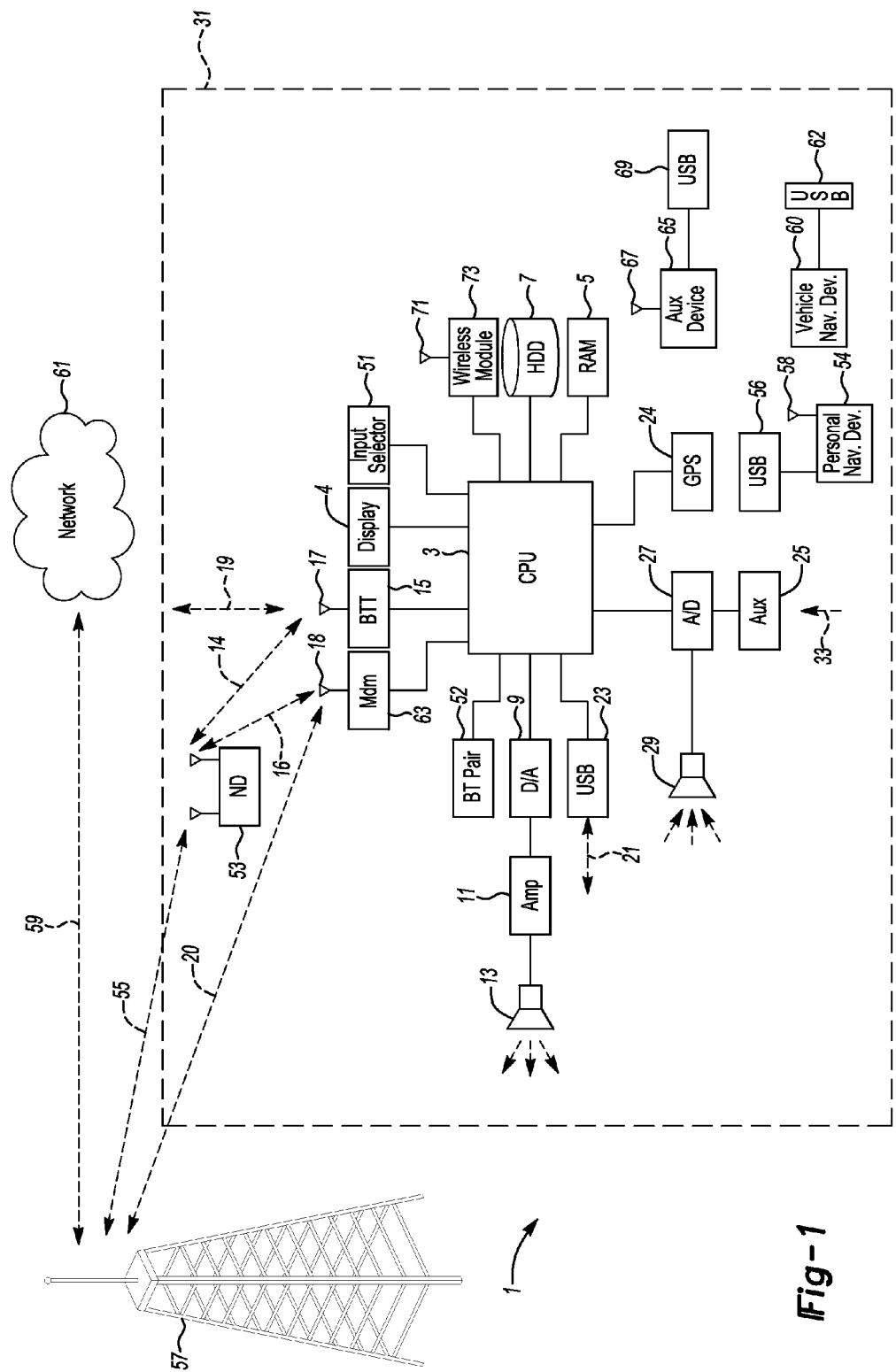
FIG. 1 shows an illustrative example of a vehicle computing system and a remote network.

FIG. 1 illustrates an example block topology for a vehicle based computing system 1 (VCS) for a vehicle 31. An example of such a vehicle-based computing system 1 is the SYNC system manufactured by THE FORD MOTOR COMPANY. A vehicle enabled with a vehicle-based computing system may contain a visual front end interface 4 located in the vehicle. The user may also be able to interact with the interface if it is provided, for example, with a touch sensitive screen. In another illustrative embodiment, the interaction occurs through, button presses, audible speech and speech synthesis.

In the illustrative embodiment 1 shown in FIG. 1, a processor 3 controls at least some portion of the operation of the vehicle-based computing system. Provided within the vehicle, the processor allows onboard processing of commands and routines. Further, the processor is connected to both non-persistent 5 and persistent storage 7. In this illustrative embodiment, the non-persistent storage is random access memory (RAM) and the persistent storage is a hard disk drive (HDD) or flash memory.

The processor is also provided with a number of different inputs allowing the user to interface with the processor. In this illustrative embodiment, a microphone 29, an auxiliary input 25 (for input 33), a USB input 23, a GPS input 24 and a BLUETOOTH input 15 are all provided. An input selector 51 is also provided, to allow a user to swap between various inputs. Input to both the microphone and the auxiliary connector is converted from analog to digital by a converter 27 before being passed to the processor. Although not shown, numerous of the vehicle components and auxiliary components in communication with the VCS may use a vehicle network (such as, but not limited to, a CAN bus) to pass data to and from the VCS (or components thereof).

Outputs to the system can include, but are not limited to, a visual display 4 and a speaker 13 or stereo system output. The speaker is connected to an amplifier 11 and receives its signal from the processor 3 through a digital-to-analog converter 9. Output can also be made to a remote BLUETOOTH device such as PND 54 or a USB device such as vehicle navigation device 60 along the bi-directional data streams shown at 19 and 21 respectively.

In one illustrative embodiment, the system 1 uses the BLUETOOTH transceiver 15 to communicate 17 with a user's nomadic device 53 (e.g., cell phone, smart phone, PDA, or any other device having wireless remote network connectivity). The nomadic device can then be used to communicate 59 with a network 61 outside the vehicle 31 through, for example, communication 55 with a cellular tower 57. In some embodiments, tower 57 may be a WiFi access point.

Exemplary communication between the nomadic device and the BLUETOOTH transceiver is represented by signal 14.

Pairing a nomadic device 53 and the BLUETOOTH transceiver 15 can be instructed through a button 52 or similar input. Accordingly, the CPU is instructed that the onboard BLUETOOTH transceiver will be paired with a BLUETOOTH transceiver in a nomadic device.

Data may be communicated between CPU 3 and network 61 utilizing, for example, a data-plan, data over voice, or DTMF tones associated with nomadic device 53. Alternatively, it may be desirable to include an onboard modem 63 having antenna 18 in order to communicate 16 data between CPU 3 and network 61 over the voice band. The nomadic device 53 can then be used to communicate 59 with a network 61 outside the vehicle 31 through, for example, communication 55 with a cellular tower 57. In some embodiments, the modem 63 may establish communication 20 with the tower 57 for communicating with network 61. As a non-limiting example, modem 63 may be a USB cellular modem and communication 20 may be cellular communication.

In one illustrative embodiment, the processor is provided with an operating system including an API to communicate with modem application software. The modem application software may access an embedded module or firmware on the BLUETOOTH transceiver to complete wireless communication with a remote BLUETOOTH transceiver (such as that found in a nomadic device).

In another embodiment, nomadic device 53 includes a modem for voice band or broadband data communication. In the data-over-voice embodiment, a technique known as frequency division multiplexing may be implemented when the owner of the nomadic device can talk over the device while data is being transferred. At other times, when the owner is not using the device, the data transfer can use the whole bandwidth (300 Hz to 3.4 kHz in one example).

If the user has a data-plan associated with the nomadic device, it is possible that the data-plan allows for broad-band transmission and the system could use a much wider bandwidth (speeding up data transfer). In still another embodiment, nomadic device 53 is replaced with a cellular communication device (not shown) that is installed to vehicle 31. In yet another embodiment, the ND 53 may be a wireless local area network (LAN) device capable of communication over, for example (and without limitation), an 802.11g network (i.e., WiFi) or a WiMax network.

In one embodiment, incoming data can be passed through the nomadic device via a data-over-voice or data-plan, through the onboard BLUETOOTH transceiver and into the vehicle's internal processor 3. In the case of certain temporary data, for example, the data can be stored on the HDD or other storage media 7 until such time as the data is no longer needed.

Additional sources that may interface with the vehicle include a personal navigation device 54, having, for example, a USB connection 56 and/or an antenna 58; or a vehicle navigation device 60, having a USB 62 or other connection, an onboard GPS device 24, or remote navigation system (not shown) having connectivity to network 61.

Further, the CPU could be in communication with a variety of other auxiliary devices 65. These devices can be connected through a wireless 67 or wired 69 connection. Also, or alternatively, the CPU could be connected to a vehicle based wireless router 73, using for example a WiFi 71 transceiver. This could allow the CPU to connect to remote networks in range of the local router 73. Auxiliary device 65 may include, but are not limited to, personal media players, wireless health devices, portable computers, and the like.

As previously noted, it is cost prohibitive at best, and potentially futile at worst, to build a variety of stationary data collectors to add to the conglomerate knowledge of weather related conditions. Weather related conditions include, but are not limited to, temperature, wind speed, wind chill, humidity (relative and absolute), barometric pressure, etc.

One big drawback to these stations is that they do not guarantee additional revenue for the providers. Additionally, locking down a piece of land for the purpose of data collection, regardless of the size of land required (which may be quite small), when multiplied by millions of stations, carries an incumbent cost as well. It may be possible, however, to use existing sensors (and to provide further sensors at a very moderate cost) to engage in data provision.

According to at least one illustrative embodiment, if a system having some weather data sensing capability can be cheaply implemented, and if that system further has data distribution capability built in, then that system may be applied in a cost effective manner to gather weather data without incurring much of the overhead typically associated with setup and installation of a data gathering point.

In a first illustrative embodiment, weather data is "crowdsourced" from millions of automobiles traveling along the nation's highways. In this illustrative embodiment, vehicle sensors gather data relating to weather and periodically (or on demand) transmit that data to one or more central data clearinghouses. The data can then be cataloged based on GPS coordinates associated with the vehicle's position where the data reading was taken.

When a particular vehicle needs to know weather data, it can send a request to the central data clearinghouse for its particular locale. Based on presumably thousands of data points gathered in the area (and combinable with existing weather forecasts, satellite data, etc), a weather prediction can be custom tailored for a specific vehicle's location. In this illustrative embodiment, this system can tailor, for example, the weather request by paying more attention to the data points closest to the vehicle and giving less weight to data points further from the vehicle.

In addition to real time condition generation, however, the massive amount of available data lends itself to more accurate weather prediction. Since a vehicle computing system is often also capable of knowing a planned route of a vehicle, the system can pre-request a custom forecast for the route to be traveled. This lets the driver know if the vehicle is likely to encounter inclement weather, and, additionally, the vehicle can predictively adjust control settings in accordance with weather to be encountered. There may be situations where it is desirable to adjust a vehicle control setting prior to actually encountering an instance of weather, as opposed to reactively adjusting the system to condition detection while in the weather.

Weather prediction data may also be useful in directing the route of a vehicle, if, for example, the user desires to avoid certain weather conditions entirely. In another instance, such as with a vehicle equipped with solar recharging capability, the route may be re-routed around cloud cover to provide maximum recharge while traveling.

Currently, it may be less than desirable to include certain sensors such as, but not limited to, humidity sensors or wind speed sensors on a vehicle. Wind speed may vary greatly with gusts, and is, of course, subject to alteration by vehicle movement. Similarly, humidity sensors may not be able to obtain an accurate reading due to the almost constant motion of the vehicle. If, however, weather data were usable to provide both advanced weather prediction abilities for drivers and/or for actual licensing to outside parties, it may be more desirable to add certain currently omitted sensors to a vehicle. If these sensors only function properly when a vehicle is not in motion, then several options exist. A capacitor can store a limited charge, for example, and cause the activation of the sensor at one or more times when the vehicle is actually powered down. Alternatively or additionally, whenever the vehicle is stopped (at a light, for example) the sensors could activate and report.

While a single vehicle equipped with a wind speed sensor may not be able to gather data sufficient to aid that vehicle in travel (since it may be reliant on the times the vehicle was not in motion), twenty thousand vehicles equipped with wind speed sensors in a ten mile area provide some interesting opportunities. For example, while a particular vehicle may be in motion (thus potentially rendering its own wind speed sensor non-functional in a meaningful fashion), there is a fair chance than any number of the twenty thousand vehicles are not in motion. Thus, through crowdsourcing, a meaningful measurement of wind speed and direction for an area can be obtained.

In the case of very strong winds, as one non-limiting example, several useful things may be knowable. First, for extreme winds, such as microbursts, a user may want to avoid an area entirely. Usually, when severe weather warnings are issued, they are issued for broad areas, designed to anticipate a sweeping weather front that will cross many points. This is of little use to a person who is forced to drive in the area, however, as all they know is that they might encounter some weather. If certain vehicles already in the severe weather were dynamically reporting, the actual shape and scope of the bad weather could be tracked, and other vehicles could be routed around the weather. For example, if a small portion of a county is being battered by microbursts, drivers could be perfectly fine to drive elsewhere in the county, and have little to fear. Drivers currently stuck in the storm could be quickly routed to the closest known edge as well (reporting back condition data the whole while).

While some of this data may be available from satellites and weather stations, having continuously reported massive dataflow available will tend to make the data more accurate and less dated.

In another illustrative embodiment, regional "weather status" can be provided for numerous areas into which a provider desires to divide a larger region. For example, without limitation, Michigan can be broken into several hundred squares, each a certain distance across. Weather can then be determined for the centers of each square, for example, based on all the vehicles within the square. Based on a particular vehicle's location within the square, a report can be provided. In at least one illustrative embodiment, as a vehicle approaches the edge of a square, the reported data gradually incorporates at least some portion of the data from surrounding squares being approached by the vehicle as well.

This blended forecast should be reasonably accurate, as long as the squares are not too large, and it may take some strain off of a server striving to provide exact forecasts for each requesting vehicle. In this example, instead of providing a custom forecast on demand, the server periodically updates an area forecast and provides a semi-custom forecast based on a vehicle's location and the last updated area data.

In still another illustrative embodiment, a vehicle is simply given a report based on a predefined region in which it is currently traveling. While perhaps not as pin-point accurate as other models, this is likely to be the least server intensive, since it is a simple reporting back of a general area weather state. Different levels of forecasts and different types of data may all be available within a single system and, for example, be doled out to vehicles based on a subscription level.

Figure 2:
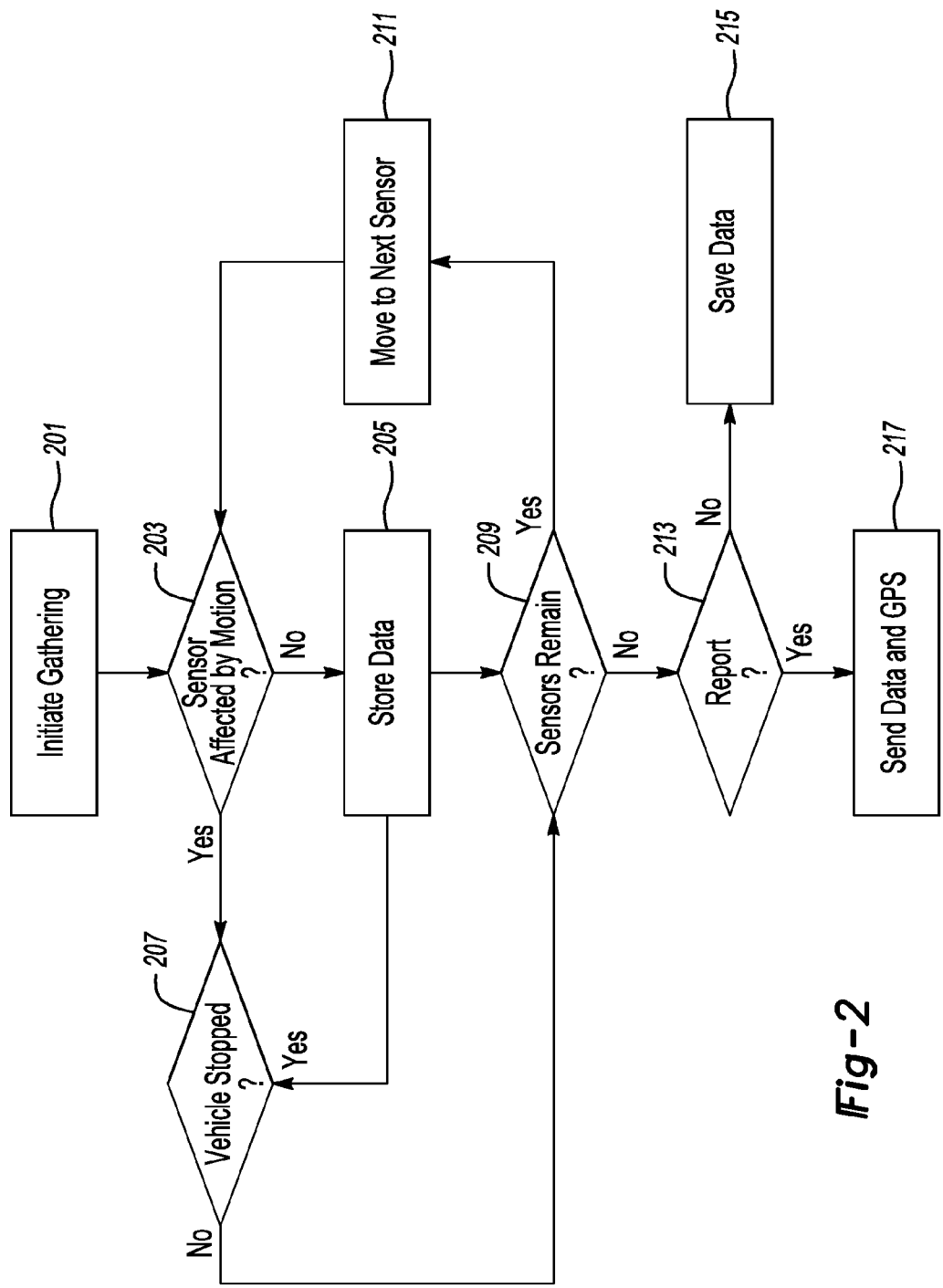
FIG. 2 shows an illustrative example of a vehicle data gathering and reporting flow.

FIG. 2 shows an illustrative example of a vehicle data gathering and reporting flow. In this illustrative example, a large number of vehicles have been equipped with data gathering equipment. This model allows for hundreds, thousands or even millions of data points to be collected throughout a day, providing a comprehensive image of weather in the area where the vehicles travel. It may even be possible for vehicles to passively gather data.

For example, a capacitor in the vehicle may hold a small charge, allowing the vehicle to gather limited data while the vehicle is at rest. Or a vehicle battery with sufficient charge could be tapped (which may be a more practical solution in an electric vehicle, for example). To protect against false data in, for example, a garage situation, temperature gathered at the vehicle can be compared to temperature gathered in the area, and the data can be discarded if the temperature shows too great an inconsistency.

Further, data may only be useful on a temporal basis, that is, around the time it is collected. If a connection is not available to a remote network (for example, if a wireless device providing a connection is not connected to the vehicle within a certain temporal proximity to when the data was collected), the data may be discarded as "old" data. In another example, each time the data is collected, while the vehicle is not connected to a remote source, the previous data is discarded.

In this illustrative example, shown in FIG. 2, a vehicle computer system initiates data gathering 201. This could be done on a periodic basis, at times throughout a drive, for example, or at fixed times throughout a day. If data remains relatively static, data gathering may be decreased, whereas rapid changes in data may increase the rate of gathering (so as to develop a more accurate picture of a weather condition). Of course, the distance a vehicle travels between gather points can also be considered (e.g., without limitation, a vehicle traveling only a few miles and showing great deviance in conditions may indicate a rapidly changing system, whereas a vehicle that has traveled 30-40 miles since the last data point may simply have moved into a new weather condition). Data gathering frequency may also be based, for example, on a distance traveled by a vehicle.

In this illustrative embodiment, a myriad of sensor data will be collected by the vehicle during each gather. Some sensors, such as, but not limited to, a wind sensor, for example, may be generally useless while a vehicle is in motion (since the speed and heading of the vehicle will likely skew the data). Thus, in this embodiment, for each sensor to be monitored, the system checks if the sensor is motion sensitive 203. If the sensor is affected by motion, the system will only gather data 205 if the vehicle is not in motion 207. Some sensors may also require the vehicle to be at rest for more than a few seconds, and a subroutine can be written to handle this check as well.

If a sensor is motion sensitive, and since it may not be the case that a vehicle happens to stop when gathering occurs (assuming periodic as opposed to continuous gathering, which is also possible), the system may set a flag to gather that sensor data the next time the vehicle is stopped. In this fashion, the sensor data from motion-affected sensors can also be gathered.

Once the sensor data is stored 205, or the sensor is skipped because the vehicle is in motion 207, the system checks to see if any sensors remain to be checked 209. Some data may need to be gathered more frequently than other data, so it may be desirable to only gather certain data with one frequency, and to gather other data with a greater or lesser frequency.

If sensor data remains to be gathered 209, the system moves to a next sensor and repeats the motion check and gathering process. This continues until all desired data is gathered. Although not shown in this embodiment, if, for example, a PRNDL park condition is detected (i.e., the vehicle is stopped and placed into park), data gathering may cease and current data may be uploaded (since it is likely that a connection to a remote network will soon be lost if the vehicle is parked and the occupant is exiting the vehicle).

Once the data is gathered, the system checks to see if a report is requested/possible 213. Even if a connection to a remote network is not presently available, data may still be gathered, because the connection may be made available at any time. Also, due to server bandwidth constraints, for example, it may be the case that data does not report on every gather, but rather on every several gathers, or at particular times, etc. If data reporting is not desired, the data is saved 215, at least temporarily. Otherwise, the data is uploaded to a remote network 217.

Figure 3:
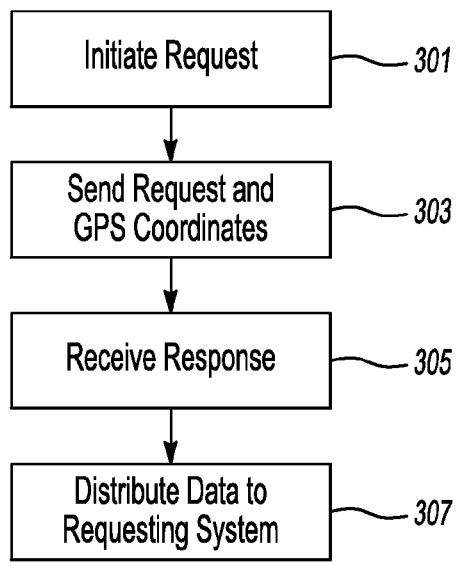
FIG. 3 shows an illustrative example of a weather data request flow.

FIG. 3 shows an illustrative example of a weather data request flow. In this illustrative embodiment, a vehicle is requesting data from a remote network. This request may be for the purpose of providing a general weather report to a driver, or, for example, a particular vehicle system may need a certain type of data for use in controlling a vehicle module.

As one non-limiting example, the use of humidity in a vehicle system control environment can be examined. Currently, it is not common to measure humidity at a vehicle using on-board sensors.

Humidity, however, is one of the largest noise factors affecting accuracy of hot-wire air mass flow sensors as it influences thermal conductivity, specific heat and molecular viscosity of air (which affects the relation between airflow and current through hot wire). Humidity may also be a significant factor for ammonia sensors, which have been proposed for urea dosing control in diesel engines and for on-board diagnostics.

Humidity also changes the oxygen concentration in fresh air. The oxygen concentration of a standard atmosphere is assumed during adaptation of voltage characteristics of certain exhaust sensors, such as oxygen sensors, that are commonly used in modern vehicles.

Humidity also affects combustion, in particular, MBT spark timing and borderline spark timing. Thus, if humidity is known, fuel economy can be improved by operating the engine closer to MBT spark timing without the occurrence of knock.

Also, when combined with the ambient air temperature, humidity is helpful for determining the dew point of exhaust recirculation gasses for cooled EGR. Sensing of humidity can offer robustness, fuel economy and emissions improvements. Further benefits and improvements can be obtained by sensing of, for example, without limitation, ambient temperature, ambient pressure, cloudiness, visibility, cloud ceiling, precipitation, rain droplet size, wind speed, wind direction, etc.

In the illustrative embodiment shown in FIG. 3, a vehicle or vehicle system initiates a request for weather data 301. This request is sent, along with GPS coordinates of the vehicle 303, to a remote server, which, in this embodiment, stores and serves out weather data. In this embodiment, the GPS coordinates are included with the request, because these coordinates are useful in determining exactly where, in particular, the weather data is requested.

The system eventually receives a response from the server 305, containing comprehensive weather data, or perhaps one or two specific data types. This data is then provided to a user or distributed to one or more requesting sensors 307.

In another exemplary model, weather data is automatically served to vehicles on the road. Since it is possible to know the projected route of a vehicle in many instances (due to a request for map directions, for example), the data for a route may be periodically served and/or served in response to changing conditions. Of course, the request for data model can also be available in this case as well, for vehicle's whose route is unknown or if a particular vehicle system simply needs new data.

Figure 4:
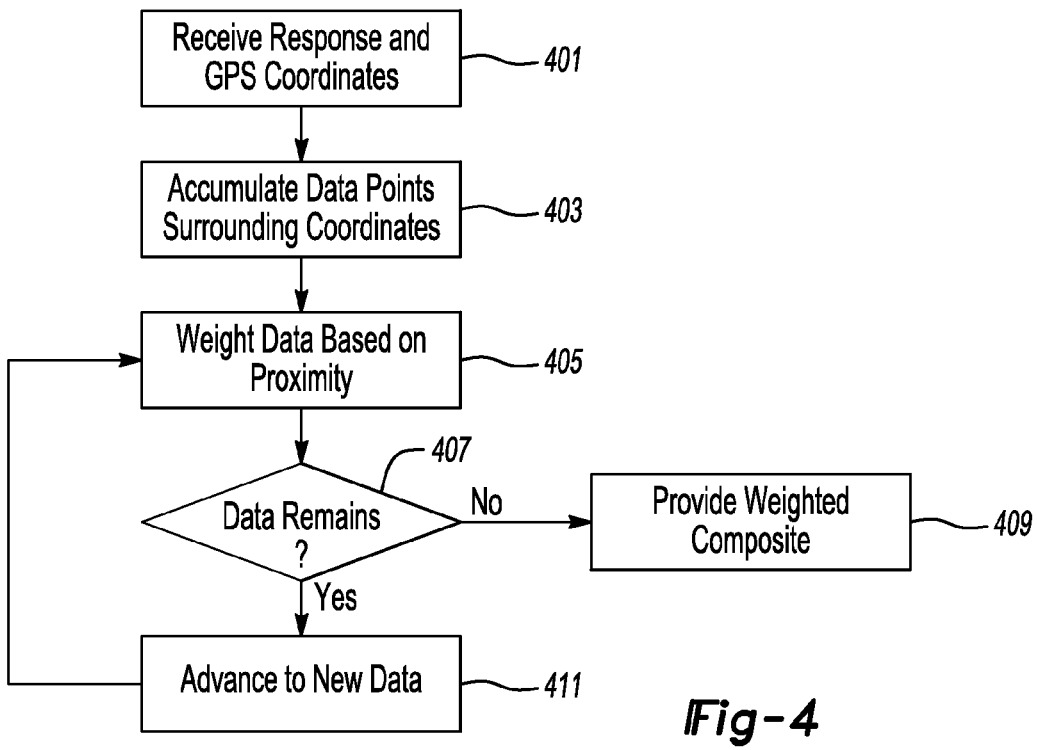
FIG. 4 shows an illustrative example of a weather data reporting calculation and response.

FIG. 4 shows an illustrative example of a weather data reporting calculation and response. In this illustrative embodiment, this is a server-side process that responds to data requests from vehicles. This is an example of a reasonably accurate compositing of data, although different levels of compositing may be available, according to, for example, a subscribed service level.

In this illustrative embodiment, a remote server receives a request for weather data along with vehicle coordinates 401. Data on a projected route may also be passed along or pulled from a remote source, in case processing takes more than a certain period of time (although this step is by no means necessary).

Once the location (or projected location) of the vehicle is known, the server gathers a variety of data points surrounding the vehicle at different radii. The system may gather points equally, for example, or it may focus on points in a pattern. Patterns include, but are not limited to, more points in the heading of the vehicle, an oval centered ahead of the vehicle and oriented lengthwise with the heading, an abnormal shape surrounding a projected path, etc.

The system takes a first point or set of points, in some relative proximity to the vehicle's location (or projected location, path, etc) and assigns a weight to those points 405. The system then checks to see if data remains to be weighted 407. If data remains, the system advances to the new data 411, weighting and repeating the process until all data is weighted. Once all the data is weighted, the server returns a weighted composite of the data, providing a relatively accurate image of area weather.

In one illustrative embodiment, the data points are simply points that correspond to remotely gathered data, i.e., the actual GPS coordinates where the data was gathered. In another illustrative example, the points are extrapolated from gathered data, to form a somewhat uniform network of points. Or the two sets may be combined. Other suitable methods of point determination may also be used.

It may also be desirable for the server to receive the vehicle's speed and heading. In this manner, for example, if it takes approximately 10 seconds to gather the data and 5 seconds to return the data, the system can "guess" where the vehicle is likely to be in 15 seconds, even if the current route is unknown. This allows for a projection of weather at the vehicle's likely current location, as opposed to where the vehicle was when the request was made.

If, for example, a vehicle is traveling west at 60 mph, and processing is projected to take 20 seconds, the system may "guess" that a vehicle is likely to be approximately ⅓ of a mile further west when the data is received. A circle, oval, or any other suitable point determination algorithm, of points around that location can be examined, with points closer to the location being given more weight. A weighted average may then be returned (along with other local data if desired, in case the vehicle has changed headings or speeds).

In a more complex algorithm, since sufficient data will allow storm tracking, for example, and storm direction and speed may generally be known, the speed and heading of the weather may be compared with the speed and heading of the vehicle, in order to weight data more accurately.

This data gathering may also be useful, for example, in order to route vehicles around a weather system. For example, if a driver does not wish to travel in certain weather (snow, rain, winds of X speed, etc), a projected route can be compared to weather data in order to route the driver around known weather systems.

Figure 5:
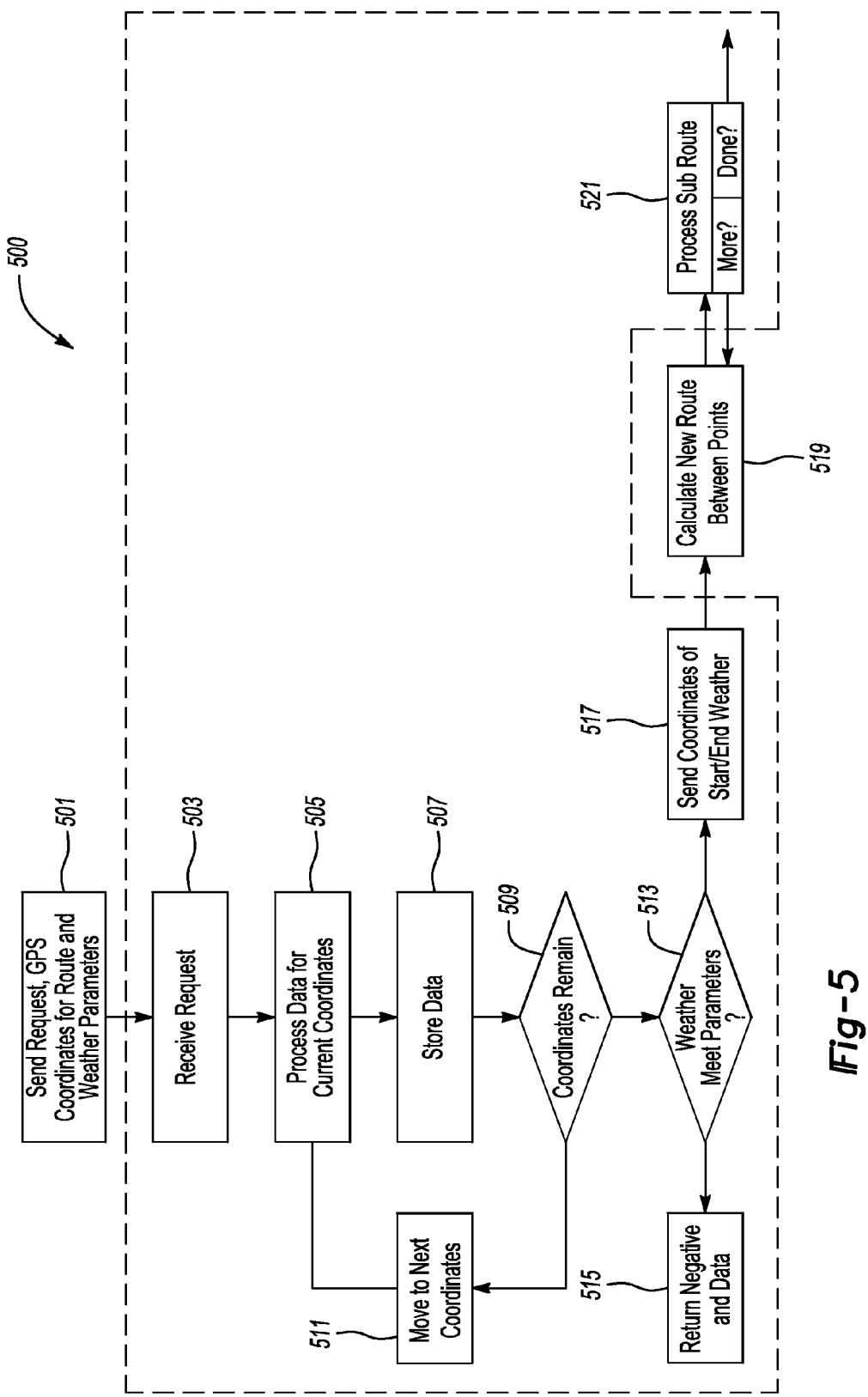
FIG. 5 shows an illustrative example of a request process for requesting weather for a route, including adjusting the route based on reported weather.

FIG. 5 shows an illustrative example of a request process for requesting weather for a route, including adjusting the route based on weather. In this illustrative embodiment, a request for data and routing is sent, along with GPS coordinates, a route (or a reference to where a route can be found, if on a remote server, and if the weather server does not already know this data), and weather parameters (e.g., without limitation, avoid weather of X and Y type) 501.

The remote server 500 (designated by the dashed line in this example) receives the weather request 503 along with the accompanying data. Route data may also be retrieved from another source at this point, if needed.

Then, at periodic points along a particular route, weather conditions (current or projected at the time of vehicle arrival at that point) are examined 505. The weather data for the points is stored 507, and the server checks to see if any route points remain 509. If there are still points to be checked along the route, the system moves to a next set of coordinates 511 and the data is again examined and stored.

Once no coordinates remain, the system checks to see if the projected weather data meets the "avoid" parameters for any stretch of the route 513. If the route is clear of the weather to be avoided, the system returns a "negative" (in this example) and any requested data 515.

If one or more portions of the route contain the weather, the system will either calculate 519 a new route avoiding the weather or, in this example, send the coordinates of the start and end points of a weather, along with other data, to a routing engine (in the car, on another server, etc.) 517. Although not necessary, it may be helpful to send some basic re-calculation parameters such as "weather system moving south" (so that a northward alternate route may be calculated). Another non-limiting alternative would be to send the closest proximate point or points where the weather is not expected at the vehicle's arrival time, and the routing engine could attempt to plot a route through those points.

A new route is calculated 519 for each stretch of weather, or for the most proximate stretch, at least, and the sub-route (the new route) is processed with the same eye towards avoidance 521. Through one or more iterations, it should be possible to avoid storm systems of a certain size or smaller. In another example, the driver may specify a maximum delay to be associated with a new route (e.g., without limitation, "take me no more than 15 minutes out of my way to avoid X type of weather."

Of course, some weather will be unavoidable, and the vehicle computing system, using data returned from the remote server, can also inform the driver if the weather will simply have to be braved.

Figure 6:
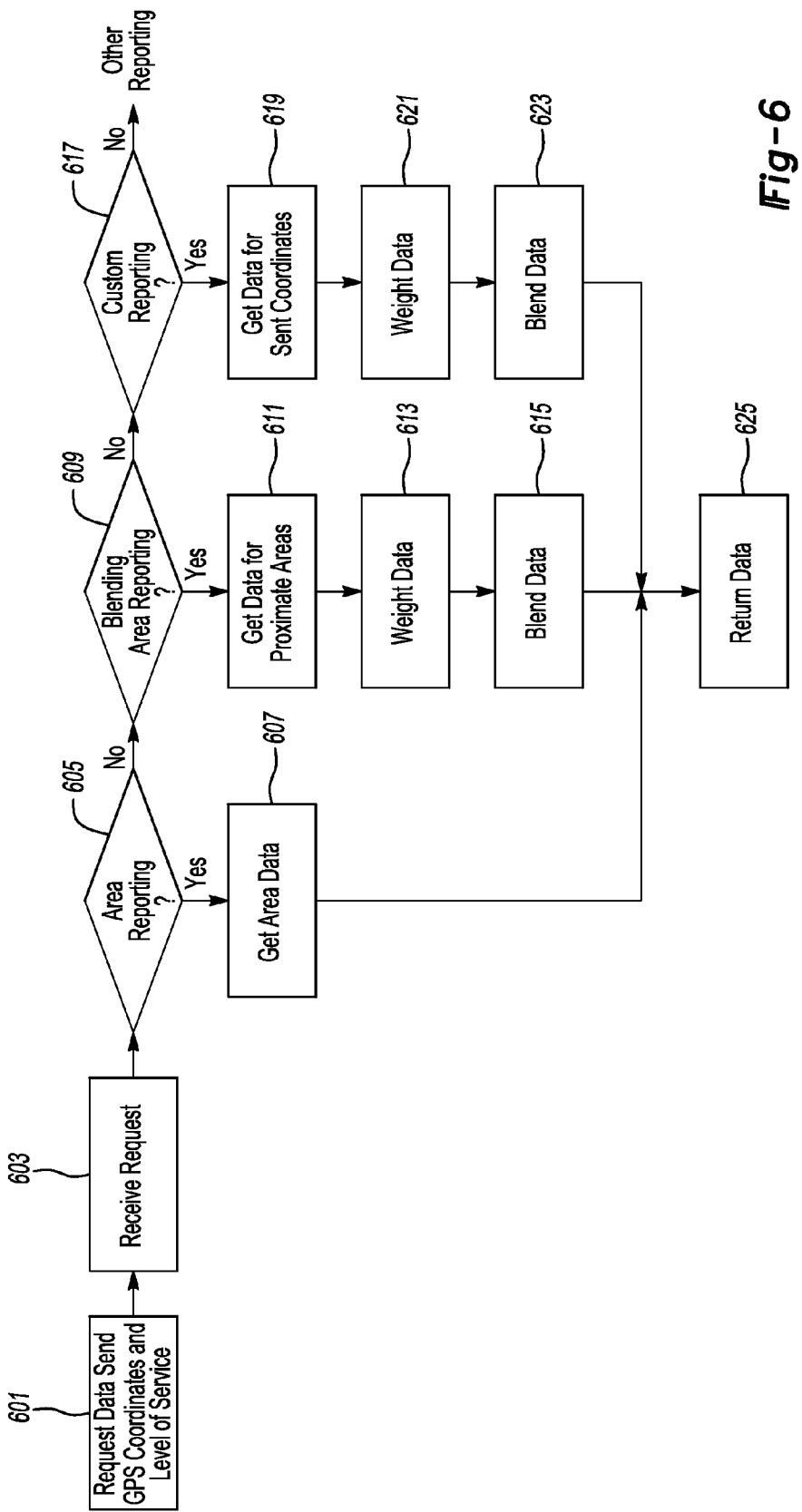
FIG. 6 shows an illustrative example of a request and response flow for a weather data collection and reporting system incorporating varying levels of data reporting.

FIG. 6 shows an illustrative example of a request and response flow for a weather data collection and reporting system incorporating varying levels of data reporting. In this illustrative embodiment, varying levels of weather reporting are available for vehicles. Although provided as examples, these levels are not intended to define the scope of available levels or methods of aggregating and blending data, but are rather provided as just some instances of embodiments.

In this illustrative example, a request is sent to a server, including GPS coordinates (and/or route coordinates and information) and a level of service qualifier 601.

A remote server receives the request and checks which type of reporting is requested. In this illustrative example, the three non-limiting types of reporting are area reporting 605, blended area reporting 609, and custom reporting 617 (other reporting is also shown as an option).

If area reporting 605 is selected, the system retrieves area data 607. In this illustrative example, area data refers to data corresponding to a grid location, a town, a locality, etc. For example, the system periodically will calculate data for a given grid area, town, locality, etc. Then, based on which grid area, town, locality, etc. in which the vehicle's coordinates lie (or are projected to lie), the corresponding data is gathered and returned.

Although this type of data may have the fastest return rate (since there is no blending or aggregating based on the request, in this example), the data is also likely less accurate, since it may just be the aggregated data for the area (as opposed to the data at a specific location). The gathered data is then returned 625.

In the second non-limiting example, blended area reporting 609 is selected as an option. In this illustrative example, data for the vehicle's current (or projected) area and for proximate areas is gathered (the extent of the data can be determined by the provider). As a non limiting example, if weather data is provided in 5x5 mile grids, the system may consider the current grid square and each of the eight grid squares surrounding that grid square. In this example, the data is then weighted based on the vehicle's location within the grid square 611. For example, if the vehicle is in the upper-right corner of the grid square, the grid square and the three squares touching the corner may be given the most weight. On the other hand, if the vehicle is in the center of the grid square, all eight squares may be given a certain weight and the current grid square may be given a higher weight.

In this embodiment, since the grid is presumably just an aggregate of the data gathered within the grid, the projection may still be somewhat imprecise, but hopefully slightly more accurate than the preceding example.

After weighting the data 611, the weighted data is blended 613 and delivered to the vehicle for processing 625.

In the third non-limiting example, custom reporting is the selected option 617. In this example, data is selected 619 as, for example, described with respect to FIG. 4. The data is then weighted according to proximity (and/or known weather movement) 621 and blended to produce point data 623. This point data is then returned to the requesting vehicle 625.

In this manner, various levels of weather service can be provided in a tiered manner, so as to reduce server loads in accordance with a subscription level. On the other hand, any particular determination and delivery system may be used for all delivery, or more precise systems may be reserved for severe weather, etc.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method comprising:
   querying, via a vehicle computing system (VCS), a plurality of vehicle weather sensors in communication with a vehicle network;
   for each sensor, determining whether current driving parameters will result in accurate sensor data;
   storing the data from each sensor when current driving conditions will result in accurate sensor data from that sensor; and
   sending, from the VCS to a remote network, data from the sensors and current vehicle GPS coordinates.

2. The method of claim 1, wherein the querying is performed on a periodic basis.

3. The method of claim 1, wherein the querying is performed on an on-demand basis in response to a request for data.

4. The method of claim 3, wherein a request for data is provided by a remote server in communication with the vehicle computing system.

5. The method of claim 1, wherein the sending further includes sending the data once all sensors have been queried.

6. The method of claim 1, wherein the storing includes storing the data in a local temporary memory.

7. The method of claim 1, wherein the storing includes storing the data in a local permanent memory.

8. The method of claim 1, wherein the current driving parameters include a vehicle movement state.

9. The method of claim 1, wherein the current driving parameters include an ambient temperature detected at the vehicle.

10. A computer-implemented method comprising:
    receiving, at a server, a weather report request from a vehicle computing system (VCS), including requesting vehicle GPS coordinates;
    gathering, via a server-implemented gathering process, a plurality of data-points, corresponding to weather data reported from other vehicles at a time in close proximity to a present time, and wherein the other vehicles reported the data from coordinates within a close proximity to the included GPS coordinates;
    aggregating, via one or more server-implemented aggregation processes, the data to form a weather prediction for the included GPS coordinates, the aggregating including weighting the data based on the proximity of GPS coordinates that correspond to a point of data to the included GPS coordinates; and
    reporting the weather prediction to the vehicle computing system from the server.

* * * * *